Patented May 3, 1932

1,856,565

UNITED STATES PATENT OFFICE

CARL ADOLPHE KLEIN, OF BRIMSDOWN, AND ROBERT SKIRVING BROWN, OF LONDON, ENGLAND

TITANIUM PIGMENTS AND PROCESS OF PREPARATION THEREOF

No Drawing. Application filed August 15, 1925, Serial No. 50,484, and in Great Britain August 25, 1924.

According to the present invention a titanium pigment having a base of barium sulphate is obtained by a process which may be briefly described as follows:

A barium compound, preferably barium carbonate, is fused with a titanium ore such as rutile or ilmenite with or without a flux such as fluorspar and a reducing agent such as carbon. As a result of this fusion a slag consisting of barium and titanium oxides together with metallic iron is obtained and the bulk of the latter is removed in any suitable manner as for instance by means of magnets.

The slag consisting of barium and titanium oxides produced by the above methods is then crushed and preferably treated with magnets to remove traces of metallic iron, after which the slag is mixed with sulphuric acid to the form of a paste and heated, this resulting in the formation of an intimate mixture of barium sulphate and titanium sulphate. This mixture is ground into a paste with water and run into boiling water in the presence of organic materials such as aldehydes, sugar, starch or the like which will prevent the precipitation of iron compounds which may be present due to the presence of chemically combined iron or any remaining traces of metallic iron which may have been left in the slag.

This process results in the precipitation of meta-titanic acid on to the barium sulphate. The product so obtained is washed, dried and furnaced at a high temperature (say about 900° C.) in the presence of air so as to burn off any carbon that may be present and which would interfere with the colour of the product and, at the same time, to alter the physical condition of the material, resulting in the production of a white pigment which preferably after crushing or grinding to break down any aggregates of pigment particles can be employed for any desired purpose.

An example for carrying out the process may be given as follows:

A mixture of 394 grammes (natural) barium carbonate (98% of $BaCO_3$), 300 grammes ilmenite (55% $TiO_2$, 40% FeO), and 15 grammes of carbon on being fused in a graphite lined crucible at a temperature of 1400–1500° C. yielded, after the contents of the crucible had been allowed to cool and the mass broken up, 475 grammes of a slag containing barium oxide 33% $TiO_2$ and 88 grammes of metallic iron, this recovery being equal to 96.3% of the $TiO_2$ and 92% of the iron contained in the original mixture. The bulk of the iron being in a metallic state may be separated in any suitable manner, as by magnets, and the remainder of the process carried out in the manner above described.

Having thus described the invention, what we claim is:—

1. The process of manufacture of a titanium pigment, consisting in heating in the presence of a reducing agent with titanium ore containing iron a barium compound of a character to yield upon fusion with the titaniferous material a slag containing titanium oxide and barium oxide and metallic iron, separating the bulk of the metallic iron produced, mixing the slag of barium and titanium oxides with sulphuric acid and heating the mixture to form barium sulphate and titanium sulphate, forming this into a paste with water and running it into boiling water in the presence of organic materials of a character adapted to prevent the precipitation of iron compounds which may be present due to the presence of any chemically combined iron or any remaining traces of metallic iron which may have been left in the slag, to cause the precipitation of meta-titanic acid in the presence of barium sulphate, and washing and drying and heating this compound material.

2. In the process of manufacture of a titanium pigment the steps which comprise heating barium carbonate with a titanium ore containing iron, in the presence of a reducing agent, separating the bulk of the metallic iron produced, mixing the slag of barium and titanium oxides with sulphuric acid and heating the mixture to form barium sulphate and titanium sulphate, forming this into a paste with water and running it into boiling water in the presence of organic materials of a character to prevent the precipitation of iron compounds which may be present due to the presence of any chemically combined iron or any remaining traces of metallic iron which may have been left in the slag, causing the precipitation of the insoluble meta-titanic acid in the presence of barium sulphate.

3. A process of manufacturing a titanium pigment which comprises heating barium carbonate with a titanium ore containing iron in the presence of a flux and reducing agent, separating the bulk of the metallic iron produced, mixing the slag of barium and titanium oxides with sulphuric acid and heating the mixture to form barium sulphates and titanium sulphates, forming them into a paste with water and running it into boiling water in the presence of organic materials adapted to prevent the precipitation of iron compounds which may be present due to the presence of any chemically combined iron or any remaining traces of metallic iron which may have been left in the slag and causing the precipitation of the insoluble meta-titanic acid in the presence of barium sulphate.

4. In a process of manufacturing a titanium pigment the steps which comprises treating a slag of barium and titanium oxides with sulphuric acid to produce barium sulphate and titanium sulphate by heating, forming the mixture of sulphates into a paste with water and running it into boiling water in the presence of organic materials, causing the precipitation of meta-titanic acid in the presence of barium sulphate.

5. The process of manufacture of a titanium pigment consisting in heating in the presence of a reducing agent with ilmenite a barium compound of a character to yield upon fusion with the titaniferous material a slag containing titanium oxide and barium oxide, separating the bulk of the metallic iron produced, mixing the slag with sulphuric acid and heating the mixture to form barium sulphate and titanium sulphate, forming this into a paste with water and running it into boiling water in the presence of organic materials of a character to prevent the precipitation of iron compounds which may be present due to the presence of any chemically combined iron or any remaining traces of metallic iron which may have been left in the slag and to cause the precipitation of the insoluble meta-titanic acid in the presence of barium sulphate, and washing and drying and heating this compound material.

In testimony whereof we affix our signatures.

CARL ADOLPHE KLEIN.
ROBERT SKIRVING BROWN.